United States Patent Office 2,820,059
Patented Jan. 14, 1958

2,820,059

IMPROVED HYDROFORMYLATION CATALYSTS AND REACTION MEDIA CONTAINING NITROGEN BASES

Robert H. Hasek and Clyde W. Wayman, Kingsport, Tenn., assignors to Eastman Kodak Company, Rochester, N. Y., a corporation of New Jersey No Drawing. Application April 18, 1956
Serial No. 578,895

16 Claims. (Cl. 260—604)

This invention relates to the production of aldehydes by the addition of carbon monoxide and hydrogen to olefinic compounds. In a specific aspect this invention relates to improvements in the catalyst and reaction medium used in the production of aldehydes by the addition of carbon monoxide and hydrogen to olefinic compounds. In a more specific aspect this invention relates to additives for the reaction medium which improve the efficiency of the usual catalysts for such reactions, which activate otherwise inactive forms of a catalyst without the necessity of an induction period or a separate catalyst activation step, and which nullify the deleterious action of acidic materials on the catalyst system.

The addition of hydrogen and carbon monoxide to olefinic compounds is well known as the "oxo reaction." But it is more properly called the hydroformylation reaction since it involves essentially the addition of a hydrogen atom and a formyl group to the double bond of the olefinic compound in accordance with the following reaction.

$$RCH=CH_2 + CO + H_2 \rightarrow RCH_2CH_2CHO$$

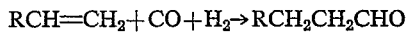

In early applications of this reaction, a finely divided active cobalt metal prepared in much the same manner that a cobalt hydrogenation catalyst is made was used as the hydroformylation catalyst. It was soon discovered that cobalt carbonyl which is formed quite readily by the action of carbon monoxide on an active metallic cobalt catalyst is an active ingredient in the hydroformylation reaction. It has been postulated and a certain degree of proof has been offered that the true catalytic agent is cobalt hydrocarbonyl. This proof was based on the observations that the same products were formed from reactions of certain compounds and cobalt hydrocarbonyl as were formed from these compounds in the hydroformylation reaction, and that bases suppressed the hydroformylation reaction, presumably by removing the acidic cobalt hydrocarbonyl as a salt.

The hydroformylation reaction has been applied to a wide variety of olefinic compounds including hydrocarbons, alcohols, esters, ethers, acetals, nitriles and the like. This invention is, of course, applicable to any of the olefinic compounds that can be employed in the hydroformylation reaction. In general, olefinic compounds with functional groups can be hydroformylated provided the functional groups do not react with the catalyst in such manner as to nullify the action of the catalyst. Also the olefinic compound should not become activated by the entering formyl group so that it has a deleterious action on the catalyst. Obviously a functional group which reacts with aldehydes will lead to secondary products after the initial hydroformylation reaction. The prior art has indicated that unsaturated acids, amides, aldehydes, ketones, amines and halogen compounds can be hydroformylated with hydrogen and carbon monoxide. More recent work has indicated that hydroformylation of these last named olefinic compounds is not routinely successful and the hydroformylation reaction is either inhibited by the acidic or basic functional groups or the nature of the reaction is changed, e. g., unsaturated aldehydes and ketones are simply hydrogenated and not hydroformylated.

In prior work involving hydroformylation reactions, lower aliphatic alcohols have been successfully employed as solvent media for the reaction. These alcohols have been used primarily because it was found that the reaction rate during the hydroformylation reaction was substantially higher in the presence of the lower aliphatic alcohols than when other solvent media were employed. Although a high reaction rate is obtained in an alcoholic medium, these alcohols react unavoidably with products formed during the hydroformylation reaction to form substantial amounts of acetals, which may be undesirable. Thus, the alcoholic media cannot be considered as being completly inert in the hydroformylation process. The desirability of improving the reaction rate in solvent media which are completely inert in the hydroformylation process is quite apparent. This represents one of the objects of this invention.

It is another object of this invention to provide a hydroformylation reaction medium of superior activity for synthesis of aldehydes by addition of carbon monoxide and hydrogen to olefinic compounds. It is another object of this invention to provide additives for hydroformylation media which enhance the activity of the catalyst contained therein and which accelerate the rate of the hydroformylation reaction. Another object of this invention is to provide hydroformylation catalysts of superior activity. A further object of this invention is to provide hydroformylation media in which substantial amounts of the cobalt carbonyl can be replaced with cobalt salts. Still another object of this invention is to provide additives which in conjunction with cobalt carbonyl cause immediate activation of otherwise inactive forms of cobalt hydroformylation catalysts. Still a further object of this invention is to provide additives which stabilize hydroformylation systems against the deleterious or inhibiting effects of acidic materials.

The above objects are accomplished by adding definite amounts of certain nitrogen-containing basic reagents to a hydroformylation system comprising a solution of cobalt carbonyl in an inert solvent. Unexpectedly the activity of the cobalt hydroformylation catalyst is enhanced and the hydroformylation reaction takes place at a faster rate than would otherwise occur.

The effective additives for this reason are monofunctional nitrogen-containing bases having an ionization constant not greater than $10^{-8}$. Basic nitrogen-containing compounds that are effective accelerating reagents in practicing this invention are the heterocyclic nitrogen bases, for example, pyridine, quinoline, the picolines, and the lutidines. In addition, aromatic amines such as aniline, toluidine, xylidine, N-methylaniline, N-butylaniline, N,N-dimethylaniline, N-ethyltoluidine can be used. Additionally, aliphatic and aromatic amides such as N,N-dimethylformamide, N-methyl-2-pyrrolidone, acetanilide and the like have been found to be quite effective. All of the above-named nitrogen-containing bases have an ionization constant less than $10^{-8}$. Stronger bases, i. e., those having an ionization constant higher than $10^{-8}$, are definitely deleterious and suppress the rate of the hydroformylation reaction frequently to the point of inhibiting the reaction entirely. Among the stronger nitrogen-containing bases that have been found to be ineffective in this reaction are ammonia, butylamine, diethylamine, piperidine and triethylamine. However, the hydroformylation reaction should not be regarded as a function of the basicity of the reaction medium, increasing with a weak base, such as pyridine, and decreasing with a stronger base, such as triethylamine. The nitrogen-containing bases which are effective accelerating agents retain their function in the presence of organic acids even when such acids are present in molar excess over the nitrogen bases. Our invention, therefore, includes as effective additives for acceleration of the hydroformylation reaction such salts as pyridine acetate, aniline acetate, N,N-dimethylaniline butyrate, quinoline crotonate, and the like wherein the salt is made up of a nitrogen base having an ionization constant less than $10^{-8}$ combined with an organic carboxylic acid. The property of nitrogen bases cited above as hydroformylation accelerating agents is obviously not dependent on their ability to control the basicity of the reaction medium, but is an inherent property of the bases themselves. These bases in addition to having an accelerating function have a stabilizing function on the hydroformylation catalyst. For example, they nullify the inhibiting effect of organic acids on the hydroformylation reaction. Thus, a hydroformylation reaction is usually inhibited by the addition of acetic acid, but in the presence of pyridine acetate, a similar concentration of uncombined acetic acid has no inhibiting effect.

Another important function of these nitrogen-containing basic compounds is their property of creating hydroformylation catalyst activity in cobalt salts when the cobalt salts and nitrogen bases are used together in the presence of cobalt carbonyl. Addition of cobalt acetate to a solution of cobalt tetracarbonyl in an inert solvent such as toluene does not yield a hydroformylation medium of any higher activity than the activity of the original cobalt carbonyl solution. Addition of pyridine, however, produces a medium with an activity as high as that of a solution in which all of the cobalt, equivalent to that in the salt and carbonyl, is present as cobalt carbonyl. By way of example, an inert solvent containing 0.5 percent cobalt in the form of cobalt acetate and 0.5 percent cobalt in the form of cobalt tetracarbonyl is normally as active as a corresponding solution containing only 0.5 percent cobalt in the form of cobalt tetracarbonyl, but if pyridine is added, the solution is as active as one containing 1.0 percent cobalt in the form of cobalt tetracarbonyl.

The inert solvents that are used as reaction media in practicing this invention are non-reactive with the hydroformylation catalyst and with the products of the hydroformylation reaction. The solvents are free of olefinic and acetylenic unsaturated bonds and they contain only carbon, hydrogen and oxygen atoms. Among the solvents that can be used are aromatic hydrocarbons such as benzene, toluene, xylene, ethylbenzene, tetralin, and the like; saturated aliphatic hydrocarbons such as butanes, pentanes, hexanes, heptanes, octanes, naphtha, gasoline, kerosene, mineral oil and the like; saturated alicyclic hydrocarbons such as cyclopentane, cyclohexane, methyl cyclohexane, Dekalin and the like. Also, ethers such as diethyl ether, dibutyl ether, anisole, diphenyl ether and dioxane can be used. Esters such as ethyl acetate, methyl benzoate, diethyl adipate and dioctyl phthalate can be used. Additionally ether-esters such as methoxyethyl acetate, and butoxyethoxyethyl acetate can be used.

The hydroformylation reaction is carried out in the conventional manner; for example, by reacting an olefinic compound with carbon monoxide and hydrogen at an elevated temperature, for example 25–150° C., and at an elevated pressure, for example 1–700 atmospheres.

The invention is illustrated by the following examples. To illustrate the accelerating effect of the basic additives employed in our process, the relative reaction rates of a standardized hydroformylation reaction were determined with and without additives. In Examples 1–4, the data are presented in tabular form to allow a ready comparison of reaction rates. These reaction rates were determined by the hydroformylation of ethylene under a standard set of reaction conditions which are described in detail in Rate test procedure I. It is understood that cobalt tetracarbonyl is a dimeric carbonyl, of formula $[Co(CO)_4]_2$, and is more properly called dicobalt octacarbonyl. However, comparison of quantities of this compound with various additives and with cobalt salts is less confusing if comparison is made on the basis of one atom of cobalt per quantity. Therefore, in the data listed in the following examples, quantities are expressed as millimoles of "cobalt tetracarbonyl"; a millimole of cobalt tetracarbonyl is hereby defined as $.001 \times Co(CO)_4 = .001 \times 171$ g. $= 0.171$ g.

RATE TEST PROCEDURE I

A clean, stainless steel 1700-cc. autoclave was charged with solvent, and the amounts of additive and catalyst specified in Tables 1–6 were added. The amount of solvent charged was such that the volume of solvent and additive combined amounted to 800 cc. The autoclave was sealed, placed in an electrically heated jacket, flushed with nitrogen, pressured with carbon monoxide to 200 p. s. i., and, while agitation was effected by rocking, was heated to 130° C. The pressure in the autoclave was then adjusted to 300 p. s. i. by addition of more carbon monoxide. At this point, the pressure was raised to 1300 p. s. i. by injection of a 1:1:1 mixture of ethylene, carbon monoxide, and hydrogen, and the hydroformylation reaction was maintained at 130° C. by manual control of coolant to an internal coil in the autoclave. The ethylene-carbon monoxide-hydrogen mixture was admitted from a 5.3-liter reservoir originally pressured to 1500 p. s. i. This quantity of gas mixture was then compressed to 3000 p. s. i. by injection of water into the reservoir. This supply of compressed gas was connected to the autoclave through a standard two-stage reducing valve set to maintain 1300 p. s. i. pressure in the autoclave. The reaction was continued until the supply chamber pressure fell to 1600 p. s. i. Reaction time was measured from the point of addition of ethylene-carbon monoxide-hydrogen mixture to the autoclave to the arbitrary termination of the reaction when pressure fell to 1600 p. s. i. in the supply chamber.

*Example 1.—Effect of nitrogen bases on rate of hydroformylation*

Various additives and cobalt tetracarbonyl were used as described in Rate test procedure I, and the corresponding reaction times were recorded as specified. Data are listed in Tables 1 and 2.

TABLE 1.—TOLUENE USED AS SOLVENT

| Additive | Amount, millimoles | Cobalt tetracarbonyl, millimoles | Reaction time, minutes |
|---|---|---|---|
| None | | 30 | 36 |
| Pyridine | 120 | 30 | 7.0 |
| α-Picoline | 120 | 30 | 6.8 |
| 2-methyl-5-ethyl pyridine | 83 | 30 | 5.1 |
| Quinoline | 60 | 30 | 6.8 |
| Aniline | 120 | 30 | 14.8 |
| N,N-dimethylaniline | 120 | 30 | 9.3 |
| N,N-dimethylformamide | 120 | 30 | 17.6 |
| N-methyl-2-pyrrolidone | 120 | 30 | 6.1 |
| Acetamide | 120 | 30 | 20.1 |
| n-Butylamine | 212 | 30 | (¹) |
| Diethylamine | 120 | 30 | (¹) |
| Piperidine | 120 | 30 | (¹) |
| Triethylamine | 120 | 30 | (¹) |

¹ No reaction.

TABLE 1A.—TOLUENE USED AS SOLVENT

| Additive | Amount, millimoles | Cobalt tricarbonyl, millimoles | Reaction time, minutes |
|---|---|---|---|
| None | | 30 | 34.8 |
| Pyridine | 120 | 30 | 9.9 |

TABLE 2.—ISOPROPYL ACETATE USED AS SOLVENT

| Additive | Amount millimoles | Cobalt tetracarbonyl, millimoles | Reaction time, minutes |
|---|---|---|---|
| None | | 30 | 24.8 |
| Pyridine | 60 | 30 | 4.7 |
| N,N-dimethylaniline | 60 | 30 | 7.7 |

*Example 2.—Effect of pyridine concentration on rate of hydroformylation*

Pyridine was used as additive in various concentrations as described in Rate test procedure I, with cobalt tetracarbonyl as catalyst, and the corresponding reaction times were recorded as specified. Data are listed in Table 3.

TABLE 3.—TOLUENE USED AS SOLVENT

| Pyridine, millimoles | Cobalt tetracarbonyl, millimoles | Reaction time, minutes |
|---|---|---|
| 0 | 30 | 36 |
| 30 | 30 | 9.2 |
| 60 | 30 | 5.8 |
| 120 | 30 | 7.0 |
| 250 | 30 | 8.3 |
| 1,000 | 30 | 10.4 |
| 2,000 | 30 | (¹) |

¹ Slight reaction, incomplete.

*Example 3.—Effect of nitrogen bases on hydroformylation media containing acid*

Nitrogen bases and acetic acid were added in the following reactions, which were run as described in Rate test procedure I. Cobalt carbonyl was used as catalyst. Data are listed in Table 4. In the run using ammonia and acetic acid, the ammonia and acetic acid were added as ammonium acetate.

TABLE 4.—TOLUENE USED AS SOLVENT

| Acetic acid, millimoles | Nitrogen base, millimoles | Cobalt tetracarbonyl, millimoles | Reaction time, minutes |
|---|---|---|---|
| 0 | None | 30 | 36 |
| 250 | do | 30 | (¹) |
| 250 | Pyridine, 250 | 30 | 5.2 |
| 500 | do | 30 | 6.7 |
| 0 | do | 30 | 8.3 |
| 0 | Triethylamine, 120 | 30 | (¹) |
| 120 | do | 30 | (¹) |

ISOPROPYL ACETATE USED AS SOLVENT

| 120 | Ammonia, 120 | 30 | (¹) |

¹ No reaction.

*Example 4.—Effect of pyridine in activation of various forms of cobalt for catalysis of hydroformylation reaction*

The Rate test procedure I was employed in the following runs. Instead of cobalt carbonyl, various combinations of cobalt salts and cobalt carbonyl were used as catalyst, and the effect of pyridine on activation of these combinations was recorded. Data are listed in Tables 5 and 6. The cobalt oxide catalyst was prepared by precipitation of cobalt nitrate solution with sodium hydroxide on activated charcoal, and the indicated amount of catalyst represents the amount of cobalt oxide on the charcoal base.

TABLE 5.—TOLUENE USED AS SOLVENT

| Cobalt tetracarbonyl, millimoles | Other cobalt compound, millimoles | Pyridine, millimoles | Reaction time, minutes |
|---|---|---|---|
| 15 | None, 0 | 0 | >30 |
| 0 | Cobalt acetate tetrahydrate, 15 | 0 | (¹) |
| 15 | None, 0 | 120 | 12.7 |
| 30 | do | 120 | 7.0 |
| 15 | Cobalt acetate tetrahydrate, 15 | 120 | 3.8 |
| 7.5 | Cobalt acetate tetrahydrate, 22.5 | 120 | 9.9 |
| 3 | Cobalt acetate tetrahydrate, 27 | 120 | 23 |
| 0 | Cobalt acetate tetrahydrate, 30 | 240 | (²) |
| 0 | Cobalt oxide catalyst, 30 | 0 | (²) |
| 15 | Cobalt oxide catalyst, 15 | 0 | 16.3 |
| 15 | do | 120 | 5.6 |

¹ Slight reaction, incomplete.
² No reaction.

TABLE 6.—ISOPROPYL ACETATE USED AS SOLVENT

| Cobalt tetracarbonyl, millimoles | Other cobalt compound | Amount, millimoles | Pyridine, millimoles | Reaction time, minutes |
|---|---|---|---|---|
| 15 | Cobalt acetate tetrahydrate | 15 | 0 | >30 |
| 15 | do | 15 | 120 | 3.1 |
| 15 | Cobalt chloride hexahydrate | 15 | 120 | 16.0 |
| 15 | Cobalt sulfate heptahydrate | 15 | 120 | 12.4 |

The following examples demonstrate the formation of salts of cobalt hydrocarbonyl and the nitrogen bases employed in our invention and the examples show further the effectiveness of these salts in hydroformylation reactions carried out in inert solvents.

*Example 7*

Cobalt tetracarbonyl (34.2 g.) was added to pyridine (100 cc.) to produce, after evolution of carbon monoxide, a dark solution, which was added in small portions, with agitation, to cyclohexene. A violent exothermic reaction took place and the mixture finally separated into two layers. The clear upper layer was removed and treated with 2,4-dinitrophenylhydrazine solution. The crystalline compound was purified by recrystallization, and melted at 167–169° C., corresponding to the melting point of the 2,4-dinitrophenylhydrazone of cyclohexanecarboxaldehyde.

*Example 8*

A solution of 34.2 g. of cobalt tetracarbonyl in 100 cc. of pyridine was treated with a 1:1 mixture of carbon monoxide and hydrogen at 1600–1150 p. s. i. and 120° for 1.5 hours. The dark solution was added in small portions, with agitation, to cyclohexene. The reaction was violent and exothermic, and when the upper layer was worked up as described in Example 7, the derivative of cyclohexanecarboxaldehyde was again obtained.

*Example 9*

A solution of 34.2 g. of cobalt tetracarbonyl in 100 cc. of pyridine was treated with carbon monoxide and hydrogen as described in Example 8. The product solution was poured into a mixture of 24.9 g. of cobalt acetate tetrahydrate in 100 cc. of pyridine. The suspended salt dissolved gradually to give a dark solution. Part of this solution was added to cyclohexane; behavior of the mixture was similar to that described in Example 7–8, and addition of 2,4-dinitrophenylhydrazine to the upper layer of the reaction mixture gave the derivative of cyclohexanecarboxaldehyde.

*Example 10*

Twenty cubic centimeters of the pyridine solution of pyridine salt of cobalt hydrocarbonyl prepared according to Example 8 was added to 780 cc. of toluene, and the solution was subjected to the Rate test procedure I.

The amount of cobalt present in the solution corresponded to 30 millimoles of cobalt tetracarbonyl, and the reaction time was 4.2 minutes.

Example 11

The quantities and procedure of Example 10 were repeated with isopropyl acetate used in place of toluene as solvent. Reaction time was 3.2 minutes.

Example 12

Twenty cubic centimeters of the pyridine solution of the complex salt prepared according to Example 9 (by addition of cobalt acetate to the pyridine salt of cobalt hydrocarbonyl) was added to 780 cc. of toluene, and the solution was subjected to the Rate test procedure I. The amount of cobalt present in the solution corresponded to 30 millimoles of cobalt tetracarbonyl, and the reaction time was 4.1 minutes.

Example 13

The quantities and procedure of Example 12 were repeated with isopropyl acetate used in place of toluene as solvent. Reaction time was 4 minutes.

It is apparent that the various additives described in this invention vary in activity. The effect of a particular additive depends not only on its particular structure, but also on the concentration of additive. Amides are weak bases, and have a pronounced but relatively minor effect on reaction rate when used in low concentration. Aromatic amines are more effective and the heterocyclic amines such as pyridine and quinoline are most effective. In the last case, however, the effect holds only at low concentrations and changes to an inhibiting effect at high concentration. Although differences in coordinating power of bases may be adjusted by variations in concentration, the extent of such adjustment is limited. Certain nitrogen bases act as inhibitors, even in low concentrations; examples are ammonia and aliphatic amines, such as triethylamine. These relatively strong bases are powerful inhibitors. Bifunctional bases are not accelerating agents, particularly if the structure of the base is such that a very stable complex is formed with cobalt. Thus, aniline in proper concentration is an accelerating agent, but o-phenylenediamine, is an inhibitor. Ethylenediamine is a particularly powerful inhibitor. In the practice of this invention, therefore, the use of bases as hydroformylation accelerators is limited to monofunctional bases of ionization constant less than $10^{-8}$, including amides and heterocyclic and aromatic amines containing only one functional nitrogen atom. The use of bases as activators for mixtures of cobalt carbonyl and cobalt salts is likewise limited to monofunctional heterocyclic and aromatic amines, and monofunctional amides.

As additives for accelerating a cobalt carbonyl-catalyzed hydroformylation reaction, nitrogen bases of ionization constant less than $10^{-8}$ are limited in their utility in terms of the ratio of base to cobalt carbonyl catalyst. This ratio should be held between 0.5 and 50 moles of base per mole of cobalt tetracarbonyl (per 0.5 mole of dicobalt octacarbonyl), and preferably between 1 and 33 moles of base per mole of cobalt tetracarbonyl.

A most important effect of bases in hydroformylation is the activation of a mixture of cobalt carbonyl and an otherwise inert form of cobalt. This effect is demonstrated in Example 4 (Tables 5–6), and Examples 12–13. Where a mixture of cobalt acetate and cobalt carbonyl in an inert solvent, like toluene or isopropyl acetate, has only the catalytic activity of the cobalt carbonyl, the addition of a weak base, such as pyridine in relatively minor amounts, produces an activity which equals or even exceeds that of a system in which all cobalt is present as carbonyl. Thus, a considerable portion of cobalt carbonyl can be replaced by cheaper cobalt salts. Replacement to as high as 90 mole percent of the cobalt can be done; higher replacement may result in an induction period before hydroformylation takes place. Cobalt salts which can be used include cobalt acetate, cobalt chloride, cobalt sulfate, and other salts of organic and non-oxidizing inorganic acids. Hydrates of these salts may be used. Preferably, a cobalt salt of an organic acid is used, since this results in higher activity. Hydroformylation catalysts can be made in this manner by addition of cobalt carbonyl and a cobalt salt to the hydroformylation system containing the base, or the carbonyl, salt and base may be combined in highly concentrated form to provide a concentrated powerful catalyst in liquid form which can be measured and injected easily into a hydroformylation system. Alternately, the addition of cobalt carbonyl and a base can be used to activate a cobalt oxide catalyst, which otherwise must be done by hydrogenation or by treatment with carbon monoxide at higher temperatures and pressures than are used in hydroformylation reactions. This effect is noted in the last three items of Table 5.

Nitrogen bases have still another point of utility in hydroformylation reactions; they act as stabilizers against destruction of the catalyst by acids. This effect is shown in Example 3 (Table 4, items 3 and 5) in which pyridine acetate is as effective an additive as pyridine itself. Moreover, the hydroformylation of the Rate test procedure I, which is inhibited by the presence of about 2 percent acetic acid (Table 4, item 2) proceeds readily in the same acidic medium if pyridine acetate is present (item 4). It is also to be noted that triethylamine acetate and ammonium acetate act as inhibitors, just as triethylamine and ammonia do.

So far, examples illustrating the practice of this invention insofar as rate studies are concerned have been limited to ethylene. This was done to provide a reliable standard method of evaluating the effect of additives by observation of the relative reaction rates. Obviously, from Examples 7–9, it is evident that the reaction product of a weak base and cobalt carbonyl will react with an olefin at room temperature and atmospheric pressure. In a rate test procedure, if a normally liquid olefin is charged at the same time as the catalyst and basic additive, there is a possibility that the initial reaction at low temperature and pressure (which would take place before the autoclave could be pressured and heated to an elevated temperature) would cast some doubt on the validity of the test. On the other hand, if the normally liquid olefin is added after the autoclave is charged with catalyst and additive and brought to the elevated temperatures and pressures of the test procedure, then the rate is governed by the concentration of the olefin and thus is affected by the rate of injection of the olefin. However, the accelerating effect of basic additives is still observed when a normally liquid olefin is used, as illustrated by the following example.

RATE TEST PROCEDURE II

A cleaned stainless steel 1700-cc. autoclave was charged with 8.9 g. (52 millimoles) of cobalt tetracarbonyl, 400 cc. of toluene, 400 cc. of diisobutylene, and basic additive (if used). The autoclave was sealed, flushed with nitrogen, pressured with carbon monoxide to 300 p. s. i., and heated to 120° C. More carbon monoxide was pressed in, if necessary, to bring the pressure to 500 p. s. i. Hydrogen was then added to make a total pressure of 1000 p. s. i. The reaction was then maintained at 120° C. and 1000 p. s. i. by addition of an equimolar mixture of hydrogen and carbon monoxide. The supply of hydrogen-carbon monoxide mixture was obtained by filling a 1350-cc. pressure vessel with the mixture to 1500 p. s. i., and then compressing the gas to 3000 p. s. i. by injecting water into the vessel. The supply was connected to the autoclave through a 2-stage regulator set to maintain 1000 p. s. i. pressure in the autoclave. The standard reaction time was taken as the time for the pressure in the supply chamber to drop from 3000 p. s. i. to 2000 p. s. i.

*Example 14*

The Rate test procedure II was used in the following experiments, and the corresponding reaction times were recorded as specified. Data are listed in Table 7.

TABLE 7

| Additive, millimoles | Reaction time, minutes |
| --- | --- |
| None | 51.4 |
| Do | 49.7 |
| Pyridine, 208 | 25.3 |
| N,N-dimethylaniline, 415 | 36.3 |
| N-methyl-2-pyrrolidone, 208 | 42.8 |
| N-methyl-2-pyrrolidone, 500 | 12.8 |
| Piperidine, 47 | [1] >80 |
| o-Phenylenediamine, 208 | [2] >45 |

[1] Incomplete reaction, stopped at 60% completion after 80 minutes.
[2] Incomplete reaction, stopped at 30% completion after 45 minutes.

Catalyst systems containing basic additives within the scope of this invention are applicable, of course, to other olefinic systems. The reactions of cyclohexene at room temperature and atmospheric pressure have been described. Other olefins react in similar fashion, or undergo hydroformylation at elevated temperatures and pressures with smaller amounts of cobalt carbonyl-basic additive systems. Other olefins include olefinic hydrocarbons, alcohols, acids, esters, ethers, nitriles, and polyfunctional derivatives, such as olefinic diacids, diesters, and the like. Representative olefinic compounds are propylene, butene, dodecene, styrene, pinene, allyl alcohol, crotonic acid, oleic acid, methyl crotonate, acrolein diethyl acetal, crotonaldehyde diacetate, isopropyl 2-pentenoate, vinyl acetate, acrylonitrile, ethyl vinyl ether, maleic acid, and diethyl fumarate. In general, olefinic aldehydes and ketones, and halogen derivatives of olefins, are not hydroformylated; crotonaldehyde, methyl vinyl ketone, vinyl chloride and allyl bromide are examples of such compounds which are not hydroformylated by the usual methods nor by the methods of this invention.

The application of the principles of this invention to substituted olefins is illustrated by the following examples. These are not rate studies, but in general the reactions are much faster than those carried out under similar conditions without basic additives. The phenomena of activation of cobalt salts and stabilization against acidic constituents are to be noted.

*Example 15*

A mixture of 200 g. of methyl acrylate, 600 g. of isopropyl acetate, 5 g. of cobalt tetracarbonyl, 5 g. of cobalt acetate tetrahydrate, and 12 g. of N-methyl-2-pyrrolidone was charged to a 1700-cc. stainless steel rocking-type autoclave. The autoclave was sealed, flushed with nitrogen, pressured with a 50-50 mixture of carbon monoxide and hydrogen to 2000 p. s. i., and heated. At 107° the reaction, which had already started, became quite rapid, and more carbon monoxide-hydrogen mixture was pressed in to maintain a pressure of 2000 p. s. i. The bulk of the reaction took place in 8 minutes, at 107-120° C.; the temperature was then allowed to rise to 133° before the autoclave was cooled and discharged.

The clear reaction mixture was flash distilled to free the product from dissolved cobalt, and the distillate was then fractionated under reduced pressure. The methyl succinaldehyde was received at 68-78° C. (10 mm.).

*Example 16*

A mixture of 200 g. of allyl acetate, 600 g. of isopropyl acetate, 5 g. of cobalt tetracarbonyl, 5 g. of unreduced recovered cobalt oxide catalyst (a catalyst originally manufactured by precipitation of cobalt as cobalt carbonate on a kieselguhr base; recovered by roasting in air), and 16 g. of acetanilide was charged to a 1700-cc. stainless steel rocking-type autoclave. The autoclave was sealed, flushed with nitrogen, pressured with a 50-50 mixture of carbon monoxide and hydrogen to 2000 p. s. i., and heated. At 115° C. the reaction reached a high velocity and more carbon monoxide-hydrogen mixture was pressed in to maintain a pressure of 2000-2300 p. s. i. The temperature was held to a maximum of 130°. Most of the reaction was finished in 15 minutes; after an additional 15 minutes the autoclave was cooled and discharged.

The product was filtered to remove solids, and the filtrate was flash distilled. The distillate was fractionated under reduced pressure to give γ-acetoxybutyraldehyde, received at 65-75° C. (5 mm.), $n_D^{20}$ 1.4230-1.4242.

*Example 17*

A mixture of 200 g. of butyl vinyl ether, 600 g. of toluene, 5 g. of cobalt tetracarbonyl, 5 g. of a toluene slurry of Raney cobalt, and 15 g. of N,N-dimethylaniline was charged to a 1700-cc. stainless steel rocking-type autoclave. The autoclave was sealed, flushed with nitrogen, pressured with a 50-50 mixture of carbon monoxide and hydrogen to 2000 p. s. i., and heated. At 120° C. a rapid exothermic reaction set in, and more carbon monoxide-hydrogen mixture was pressed in to maintain a pressure of 2000 p. s. i. The reaction was allowed to rise to 130°, and was terminated after 40 minutes by cooling the autoclave.

The reaction mixture was decanted from residual solids and flash distilled. The distillate was fractionated under reduced pressure to give, among other products, a fraction boiling at 50-65° C. (26 mm.) corresponding to α-butoxypropionaldehyde.

*Example 18*

A mixture of 200 g. of crotonaldehyde diacetate, 600 g. of isopropyl acetate, 5 g. of cobalt tetracarbonyl, 5 g. of cobalt acetate tetrahydrate, and 12 g. of p-toluidine was charged to a 1700 cc. stainless steel rocking-type autoclave. The autoclave was sealed, flushed with nitrogen, pressured with a 50-50 mixture of carbon monoxide and hydrogen to 1500 p. s. i., and heated. At 130° C., the pressure was raised to 2000 p. s. i. and maintained there by pressing in more carbon monoxide-hydrogen mixture. The reaction was rapid and was finished in 19 minutes. The autoclave was then cooled and discharged.

The reaction product was filtered and flash distilled. The distillate, fractionated under reduced pressure, gave a moderate yield of glutaraldehyde-1,1-diacetate (δ,δ-diacetoxyvaleraldehyde), received at 110-130° C. (1.5 mm.).

*Example 19*

A 1700 cc. stainless steel rocking-type autoclave was charged with 235 g. of methyl oleate containing 15% free oleic acid, 600 g. of diethyl ether, 5 g. of cobalt tetracarbonyl, 5 g. of unreduced cobalt oxide-on-kieselguhr catalyst, and 11 g. of β-picoline. The autoclave was sealed, flushed with nitrogen, pressured with a 50-50 mixture of carbon monoxide and hydrogen to 2000 p. s. i., and heated. At 130° C. the reaction started, and the temperature was allowed to rise to 144° C. while more carbon monoxide-hydrogen mixture was added to maintain a pressure of 2100-2300 p. s. i. The reaction was terminated after 40 minutes by cooling the autoclave.

The product was flash distilled and then fractionated, both under reduced pressure. The aldehydic product was received at 190-196° C. (1.7 mm.), mostly at 196° C. This product was primarily the methyl ester of a mixture of $C_{19}$ aldehydic acids.

The utility of this invention is obvious from its description. As accelerators, certain weak bases permit faster reaction rates and thus allow equivalent production from a smaller reaction vessel or with addition of smaller amounts of catalyst. The presence of these bases produces reaction rates in inert solvents which are equal to or better than those achieved in alcoholic medium. Although alcohols are superior mediums for hydroformylation, there is an unavoidable formation of appreciable amounts of acetals, which may be undesirable. The use of bases of suitable kind and amount allows replacement of substantial quantities of cobalt carbonyl catalyst by cobalt salts; no special activation step at elevated temperatures and pressures is necessary as is usually required when cobalt salts or cobalt oxide catalysts are used as catalysts. Furthermore, highly concentrated solutions of cobalt carbonyl complexes can be prepared from cobalt salts, cobalt carbonyl, and these bases, which can be handled, measured, and injected into hydroformylation systems by conventional pumping equipment.

We claim:

1. In a process for producing an aldehyde by hydroformylation of an olefinic compound, the improvement which comprises reacting said olefinic compound with carbon monoxide and hydrogen at an elevated temperature and an elevated pressure in a liquid phase comprising a cobalt catalyst, at least 10% by weight of said catalyst being in the form of a cobalt carbonyl, an organic solvent containing only carbon, hydrogen and oxygen, said solvent being inert to said cobalt catalyst and to products of said hydroformylation reaction, and a monofunctional nitrogen-containing compound selected from the group consisting of organic bases having an ionization constant less than $10^{-8}$ and carboxylic acid salts of said organic bases, the mole ratio of said nitrogen-containing compound to said cobalt catalyst being within the range of 0.5 to 50.

2. In a process for producing an aldehyde by hydroformylation of an olefinic compound, the improvement which comprises reacting said olefinic compound with carbon monoxide and hydrogen at a temperature within the range of 25–150° C. and a pressure within the range of 1–700 atmospheres in a liquid phase comprising a cobalt catalyst, at least 10% by weight of said catalyst being in the form of a cobalt carbonyl, an organic solvent containing only carbon, hydrogen and oxygen, said solvent being inert to said cobalt catalyst and to products of said hydroformylation reaction, and a monofunctional nitrogen-containing compound selected from the group consisting of organic bases having an ionization constant less than $10^{-8}$ and carboxylic acid salts of said organic bases, the mole ratio of said nitrogen-containing compound to said cobalt catalyst being within the range of 0.5 to 50.

3. A process according to claim 2 wherein said nitrogen compound is an organic base having an ionization constant less than $10^{-8}$.

4. A process according to claim 3 wherein said nitrogen compound is a heterocyclic base containing one nitrogen atom.

5. A process according to claim 3 wherein said nitrogen compound is an amide containing one nitrogen atom.

6. A process according to claim 3 wherein said nitrogen compound is an aromatic amine containing one nitrogen atom.

7. A process according to claim 2 wherein said nitrogen compound is a salt of an organic base having an ionization constant less than $10^{-8}$ and a carboxylic acid.

8. A process according to claim 7 wherein said nitrogen compound is a salt of a carboxylic acid and a heterocyclic base containing one nitrogen atom.

9. A process according to claim 7 wherein said nitrogen compound is a salt of a carboxylic acid and an aromatic amine containing one nitrogen atom.

10. A process according to claim 2 wherein the cobalt catalyst is in the form of cobalt carbonyl.

11. A process according to claim 2 wherein the cobalt catalyst is in the form of a mixture of cobalt carbonyl and a cobalt compound selected from the group consisting of cobalt salts, cobalt oxide and cobalt hydroxide.

12. In a process for producing an aldehyde by hydroformylation of an olefinic hydrocarbon, the improvement which comprises reacting said hydrocarbon with carbon monoxide and hydrogen at a temperature of 25–150° C. and a pressure of 1–700 atmospheres in a liquid phase comprising a cobalt catalyst containing cobalt tetracarbonyl and cobalt acetate tetrahydrate with at least 10% of the cobalt present as cobalt tetracarbonyl, a normally liquid hydrocarbon as an organic solvent said hydrocarbon being inert to said cobalt catalyst and to products of said hydroformylation reaction and from 0.5 to 50 molar equivalents of pyridine per atom of cobalt.

13. In a process for producing an aldehyde by hydroformylation of an olefinic hydrocarbon, the improvement which comprises reacting said hydrocarbon with carbon monoxide and hydrogen at a temperature of 25–150° C. and a pressure of 1–700 atmospheres in a liquid phase comprising a cobalt catalyst containing cobalt tetracarbonyl and cobalt acetate tetrahydrate with at least 10% of the cobalt present as cobalt tetracarbonyl, a normally liquid hydrocarbon as an organic solvent said hydrocarbon being inert to said cobalt catalyst and to products of said hydroformylation reaction and from 0.5 to 50 molar equivalents of pyridine acetate per atom of cobalt.

14. In a process for producing an aldehyde by hydroformylation of an olefinic hydrocarbon, the improvement which comprises reacting said hydrocarbon with carbon monoxide and hydrogen at a temperature of 25–150° C. and a pressure of 1–700 atmospheres in a liquid phase comprising a cobalt catalyst containing cobalt tetracarbonyl and cobalt hydroxide with at least 10% of the cobalt present as cobalt tetracarbonyl, a normally liquid hydrocarbon as an organic solvent said hydrocarbon being inert to said cobalt catalyst and to products of said hydroformylation reaction and from 0.5 to 50 molar equivalents of N-methyl-2-pyrrolidone per atom of cobalt.

15. In a process for producing an aldehyde by hydroformylation of an olefinic hydrocarbon, the improvement which comprises reacting said hydrocarbon with carbon monoxide and hydrogen at a temperature of 25–150° C. and a pressure of 1–700 atmospheres in a liquid phase comprising cobalt tetracarbonyl as at catalsyt, a normally liquid hydrocarbon as an organic solvent said hydrocarbon being inert to said cobalt catalyst and to products of said hydroformylation reaction and from 0.5 to 50 molar equivalents of N,N-dimethylaniline per atom of cobalt.

16. In a process for producing an aldehyde by hydroformylation of an olefinic hydrocarbon, the improvement which comprises reacting said hydrocarbon with carbon monoxide and hydrogen at a temperature of 25–150° C. and a pressure of 1–700 atmopsheres in a liquid phase comprising the pyridine salt of cobalt hydrocarbonyl as a catalyst and a normally liquid hydrocarbon as an organic solvent, said hydrocarbon being inert to said cobalt catalyst and to products of said hydroformylation reaction.

References Cited in the file of this patent
UNITED STATES PATENTS 2,564,104    Gresham et al.    Aug. 14, 1951
2,576,113    Hagemeyer    Nov. 27, 1951